United States Patent
Sumiya

(10) Patent No.: US 10,071,514 B2
(45) Date of Patent: Sep. 11, 2018

(54) RELEASE MEMBER MOLDING METHOD AND RECORDING TAPE CARTRIDGE

(71) Applicant: FUJIFILM CORPORATION, Minato-ku, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 615 days.

(21) Appl. No.: 14/691,583

(22) Filed: Apr. 21, 2015

(65) Prior Publication Data

US 2016/0082632 A1    Mar. 24, 2016

(30) Foreign Application Priority Data

Sep. 18, 2014   (JP) ................................ 2014-190517

(51) Int. Cl.
  *B29C 45/14*    (2006.01)
  *G11B 15/66*    (2006.01)
  *G11B 23/04*    (2006.01)
  *G11B 23/107*   (2006.01)

(52) U.S. Cl.
  CPC ...... *B29C 45/14311* (2013.01); *G11B 23/043* (2013.01); *G11B 23/107* (2013.01); *B29C 2045/14327* (2013.01)

(58) Field of Classification Search
  CPC .... B29C 45/14311; B29C 2045/14327; G11B 23/043; G11B 23/107
  See application file for complete search history.

(56) References Cited

U.S. PATENT DOCUMENTS

| | | | | |
|---|---|---|---|---|
| 2004/0232266 A1* | 11/2004 | Hiraguchi | ............ | G11B 23/037 242/338.1 |
| 2010/0123036 A1* | 5/2010 | Ishikawa | ................ | B65H 75/30 242/348 |
| 2011/0192929 A1* | 8/2011 | Hiraguchi | ............ | G11B 23/044 242/348 |
| 2016/0082632 A1* | 3/2016 | Sumiya | ................ | G11B 23/043 242/348 |

FOREIGN PATENT DOCUMENTS

JP      2004-348839 A    12/2004

* cited by examiner

*Primary Examiner* — William A. Rivera
(74) *Attorney, Agent, or Firm* — SOLARIS Intellectual Property Group, PLLC

(57) ABSTRACT

A release member molding method for mounting a metallic plate in a main body of a release member by insert-molding. The release member is to be provided to be integrally rotatable with a reel accommodated in a case, and to move a locking member from a locking position that locks rotation of the reel to an allowing position that allows rotation of the reel. The metallic plate touches a sliding protrusion portion of the locking member at a touching surface of the release member. The release member molding method includes an arranging step of arranging the metallic plate in a die and a molding step of charging a resin material into the die and molding the main body in which the metallic plate is mounted. The die contacts a portion of the metallic plate that excludes the touching surface, and the die does not contact the touching surface.

2 Claims, 10 Drawing Sheets

RELEASE MEMBER MOLDING METHOD AND RECORDING TAPE CARTRIDGE

CROSS-REFERENCE TO RELATED APPLICATION

This application claims priority under 35 USC 119 from Japanese Patent Application No. 2014-190517 filed Sep. 18, 2014, the entire disclosure of which is incorporated by reference herein.

BACKGROUND

Technical Field

The present invention relates to a recording tape cartridge that rotatably accommodates a single reel on which a recording tape such as a magnetic tape or the like is wound, and to a method of molding a release member provided in the recording tape cartridge.

Related Art

A recording tape cartridge that has been known heretofore rotatably accommodates a single reel, on which a recording tape such as a magnetic tape or the like is wound, inside a case. This recording tape cartridge enables a reduction in accommodation space during storage and may record large volumes of data. The recording tape cartridge is equipped with a locking member, which is for locking the reel so as not to rotate inside the case at times of non-use, and with a release member, which is for releasing the locking of the locking member at times of use.

During use of the recording tape cartridge, that is, during rotation of the reel, a spherical surface-shaped protrusion portion of the locking member and a flat surface-shaped touching surface of the release member, which are both resin members, slidingly contact one another. Accordingly, in the light of increasing rotation speeds aimed at shortening access times to desired recording positions and data, a recording tape cartridge has been proposed heretofore (for example, see Japanese Patent Application Laid-Open (JP-A) No. 2004-348839) in which a metallic plate that structures the touching surface is provided at a main body of the release member by caulking.

However, with the structure in which a metallic plate is caulked to the main body of the release member, a number of steps in fabrication of the release member increases, and a response to an increase in costs is required. Accordingly, providing the metallic plate at the main body of the release member by insert-molding has been considered. However, in this case there is a risk of the touching surface of the metallic plate being damaged by a die.

If the touching surface of the metallic plate is damaged, there is concern that behavior of the release member relative to the protrusion portion of the locking member may be disordered during rotation of the reel. If the behavior of the release member during the rotation of the reel is disordered, there is concern that the protrusion portion of the locking member may receive, for example, diametric direction force components from the touching surface of the release member, and that consequently noise will be generated during rotation of the reel.

SUMMARY

The present invention provides a release member molding method that, in a case in which a metallic plate is provided at a main body of a release member by insert-molding, may suppress damage to a touching surface of the metallic plate against a locking member.

In order to achieve the object described above, the release member molding method relating to the present invention is a method for mounting a metallic plate in a main body of a release member by insert-molding, the release member being provided to be integrally rotatable with a reel accommodated in a case, and the release member moving a locking member from a locking position at which the locking member locks rotation of the reel to an allowing position at which the locking member allows rotation of the reel, the release member molding method including: arranging the metallic plate in a die, the die contacting a portion of the metallic plate that excludes a touching surface, at which touching surface the metallic plate touches a sliding protrusion portion of the locking member, and the die not contacting the touching surface of the metallic plate; and charging a resin material into the die in which the metallic plate has been arranged and molding the main body in which the metallic plate is mounted.

Further, a recording tape cartridge relating to the present invention includes: a reel at which a recording tape is wound onto a reel hub whose shape is a circular tube with a bottom portion, the reel being rotatably accommodated in a case; a locking member that is provided in the reel hub to be movable in a reel axial direction, the locking member being capable of attaining a locking position at which the locking member locks rotation of the reel and an allowing position at which the locking member allows rotation of the reel relative to the case; a release member that is provided in the reel hub to be rotatable integrally with the reel, the release member moving the locking member from the locking position to the allowing position when the release member is pushed from an outer side of the case; a sliding protrusion portion that protrudes from the locking member toward a side at which the release member is disposed; and a metallic plate that is provided by insert-molding in a main body of the release member, contact damage from a die not being formed at a touching surface of the metallic plate, at which touching surface the metallic plate touches a distal end of the sliding protrusion portion, and contact damage from the die being formed at a portion of the metallic plate that is exposed from the main body, which portion excludes the touching surface.

BRIEF DESCRIPTION OF THE DRAWINGS

Exemplary Embodiments of the present invention will be described in detail based on the following figures, wherein.

DETAILED DESCRIPTION

Figure 1A:
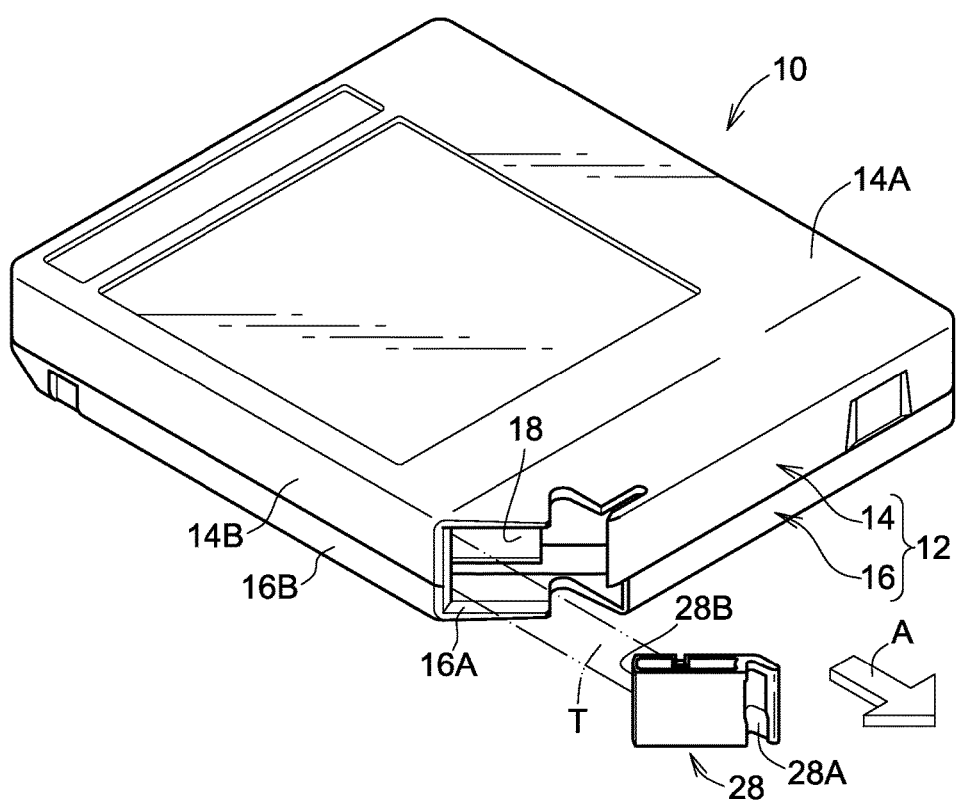
FIG. 1A is a perspective view showing a recording tape cartridge in accordance with a present exemplary embodiment, viewed from above.
Figure 1B:
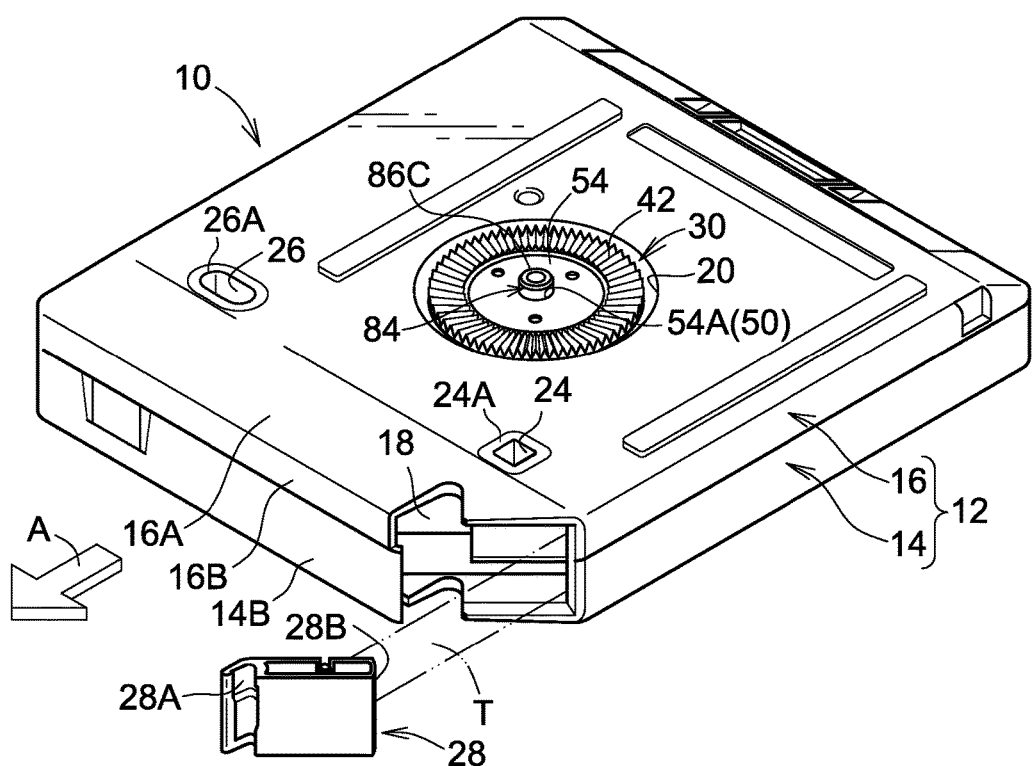
FIG. 1B is a perspective view showing the recording tape cartridge in accordance with the present exemplary embodiment, viewed from below.

Herebelow, an exemplary embodiment relating to the present invention is described in detail in accordance with the drawings. An arrow A shown in FIG. 1A and FIG. 1B represents a loading direction of a recording tape cartridge 10 into a drive device (not shown in the drawings). For convenience of description, the side indicated by arrow A is referred to as the front side of the recording tape cartridge 10.

As shown in FIG. 1A and FIG. 1B, the recording tape cartridge 10 is provided with a case 12. The case 12 is structured by an upper case 14 and a lower case 16 being joined together. Specifically, the upper case 14 is structured by a periphery wall 14B with a substantial frame shape standing along an outer edge of a ceiling plate 14A with a substantially rectangular shape in plan view, and the lower case 16 is structured by a periphery wall 16B standing along an outer edge of a floor plate 16A with a shape substantially corresponding with the ceiling plate 14A. The case 12 is formed into a substantially rectangular box shape by the upper case 14 and the lower case 16 being joined, by ultrasonic welding, screw-fastening or the like, in a state in which the open end of the periphery wall 14B is matched up with the open end of the periphery wall 16B.

An aperture 18, which is angled with respect to the loading direction in plan view, is formed in the case 12 by the ceiling plate 14A, the periphery wall 14B, the floor plate 16A and the periphery wall 16B being respectively cut away at a corner portion of the case 12 at the leading side in the direction of loading into the drive device. A circular gear aperture 20 that penetrates through the floor plate 16A is provided at a substantially central portion of the floor plate 16A. The gear aperture 20 is for exposing a reel gear 42, which is described below, and the like. An annular rib 22 (see FIG. 2) is provided at the floor plate 16A, protruding toward the interior side of the case 12 from an edge portion of the gear aperture 20. The annular rib 22 is for positioning of a reel 30, which is described below.

A pair of positioning holes 24 and 26 open at a front end vicinity of an outer face of the floor plate 16A of the case 12. The pair of positioning holes 24 and 26 are provided in pocket shapes in projection portions (not shown in the drawings) that stand to the interior side of the case 12 from the floor plate 16A. In a bottom view, the positioning holes 24 and 26 are disposed to be spaced apart from one another on an imaginary line that is orthogonal to the loading direction. One of the positioning holes 24, which is closer to the aperture 18, is formed in a substantially square shape in bottom view. The one positioning hole 24 is to contact the exterior of a positioning pin of the drive device. Another of the positioning holes 26, which is further from the aperture 18, is formed as a long hole that extends along the imaginary line and whose width corresponds to the diameter of another positioning pin.

Therefore, when the recording tape cartridge 10 is loaded in the drive device and the respective positioning pins are inserted into the positioning holes 24 and 26, the recording tape cartridge 10 is precisely positioned in horizontal (left-and-right and front-and-rear) directions in the drive device.

Regions of the floor plate 16A around the positioning holes 24 and 26 serve as positioning surfaces 24A and 26A that are finished to a higher smoothness than other regions (design surfaces). When the positioning pins are inserted into the positioning holes 24 and 26, the positioning surfaces 24A and 26A abut against positioning surfaces of the drive device, which are provided around the positioning pins. Therefore, the recording tape cartridge 10 is precisely positioned in the vertical (up-and-down) direction in the drive device.

The reel 30, which is described below, is singly accommodated inside the case 12 to be rotatable. A magnetic tape T that serves as a recording tape is wound onto the reel 30. A leader block 28 that serves as a leader member is attached to a distal end of the magnetic tape T. When the recording tape cartridge 10 is not in use, the leader block 28 is accommodated and retained at the inner side of the aperture 18 of the case 12. Thus, the leader block 28 closes off the aperture 18 and blocks the ingression of dust or the like into the case 12.

An engaging slot portion 28A is formed at the distal end of the leader block 28. When the magnetic tape T is to be pulled out inside the drive device, the leader block 28 is disengaged from the case 12 and guided to a take-up reel (not shown in the drawings) of the drive device by a pull-out member that engages with the engaging slot portion 28A. An end face of the leader block 28 at the opposite side thereof from the side at which the engaging slot portion 28A is formed is a circular arc face 28B. The leader block 28 is fitted into the take-up reel and the circular arc face 28B structures a portion of a take-up surface onto which the magnetic tape T is taken up.

Figure 2:
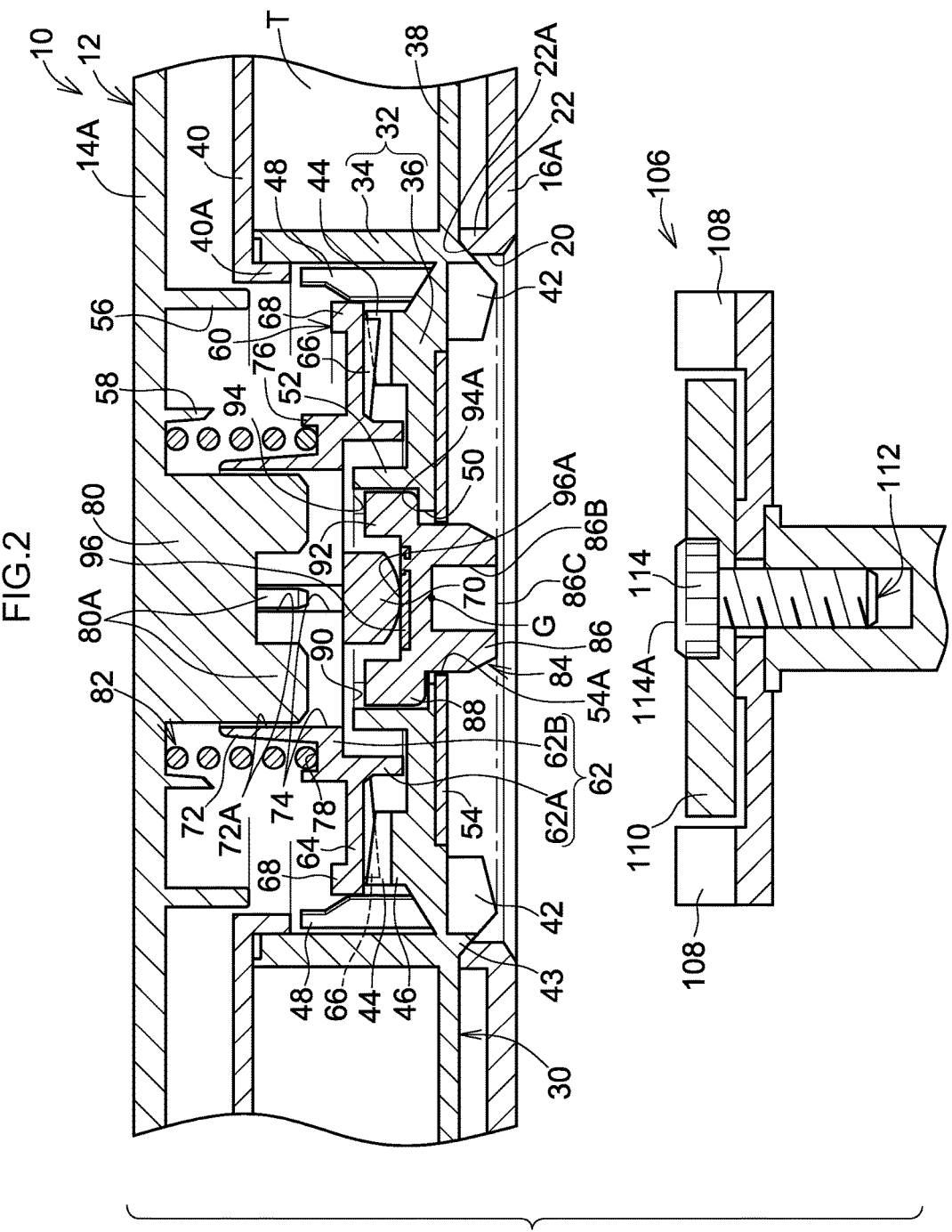
FIG. 2 is a sectional diagram showing a reel of the recording tape cartridge in accordance with the present exemplary embodiment when locked.
Figure 3:
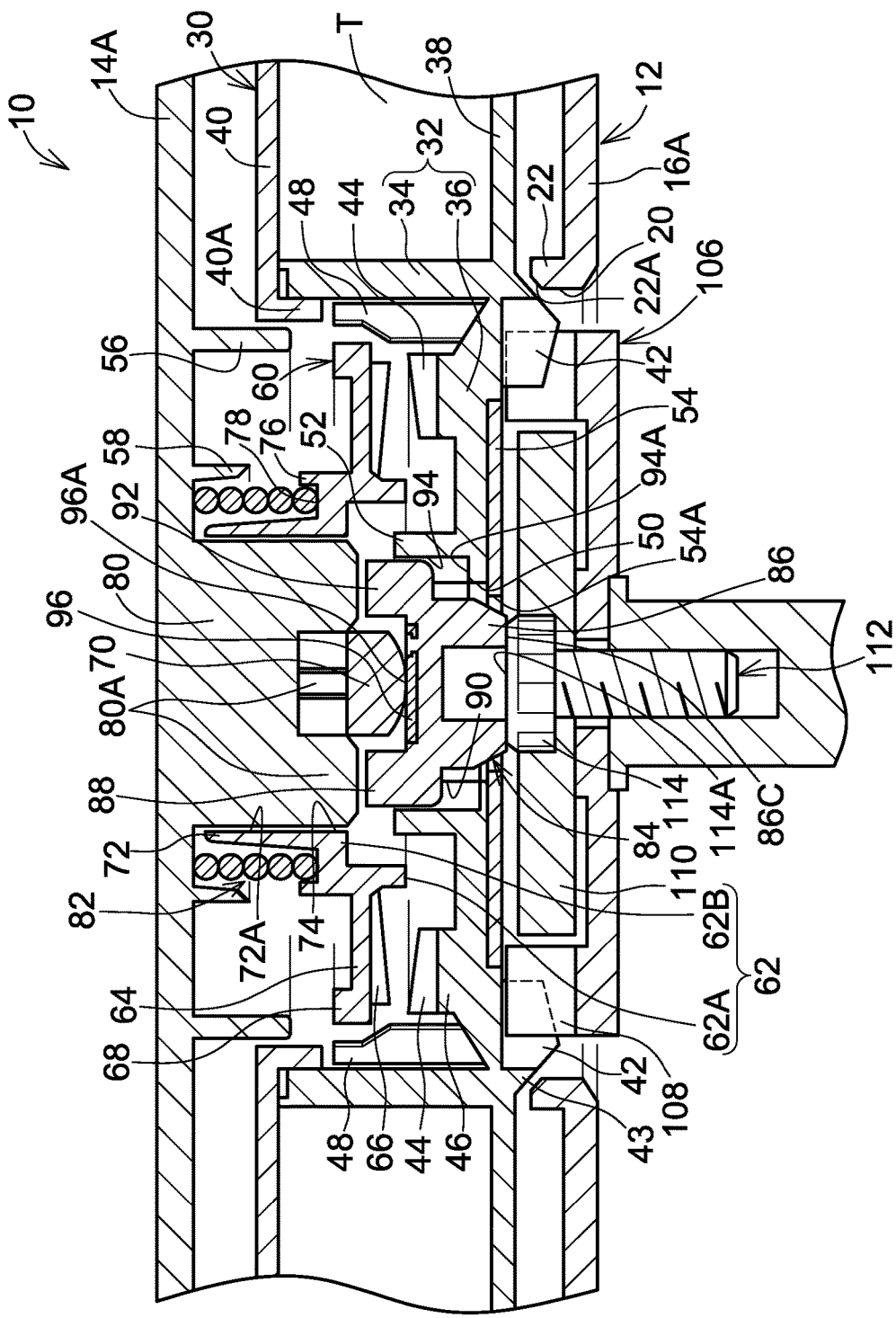
FIG. 3 is a sectional diagram showing the reel of the recording tape cartridge in accordance with the present exemplary embodiment when locking is released.
Figure 4:
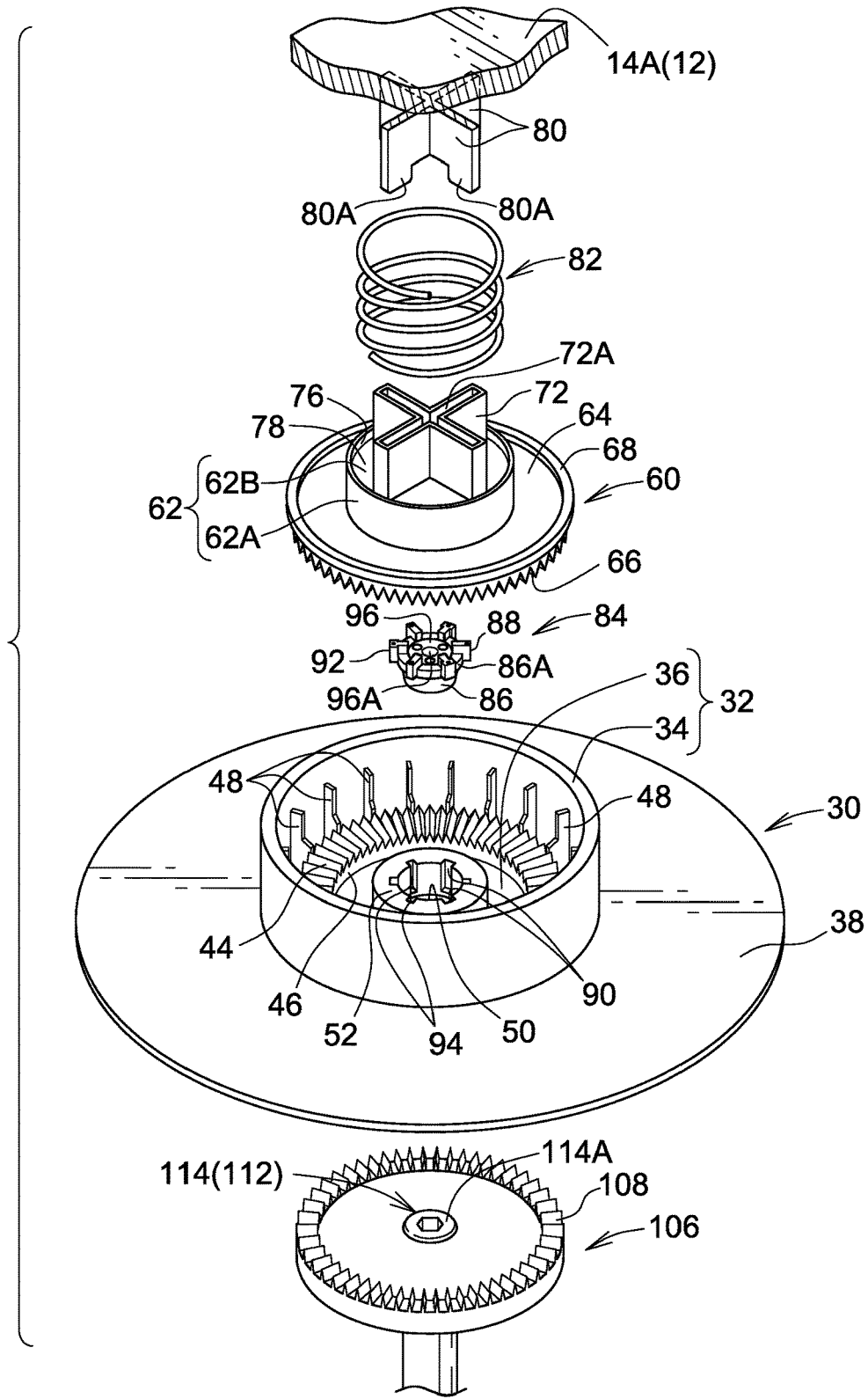
FIG. 4 is an exploded perspective view showing a locking member that structures the recording tape cartridge in accordance with the present exemplary embodiment and a rotary shaft of a drive device, viewed from above.

As shown in FIG. 2 to FIG. 4, the reel 30, which is fabricated of resin, is provided with a reel hub 32 that structures an axial center portion of the reel 30. The reel hub 32 is formed substantially in the shape of a circular tube with a bottom, including a tube portion 34 and a bottom portion 36. The magnetic tape T is wound onto an outer periphery face of the tube portion 34. The bottom portion 36 closes off a lower portion of the tube portion 34. A lower flange 38 is provided extending to the diametric direction outer side from a vicinity of a lower end portion at the bottom portion 36 side of the reel hub 32, coaxially and integrally therewith.

An upper flange 40 (not shown in FIG. 4) is joined to an upper end portion of the reel hub 32. An outer diameter of the upper flange 40 is the same as the outer diameter of the lower flange 38. A short tube portion 40A is integrally formed at an axial center portion of the upper flange 40. An outer diameter of the short tube portion 40A corresponds with an inner diameter of the tube portion 34. In a state in which the short tube portion 40A is fitted into an upper end vicinity of the tube portion 34, the upper flange 40 is fixed to the reel hub 32, so as to be coaxial therewith, by ultrasonic welding.

Figure 5:
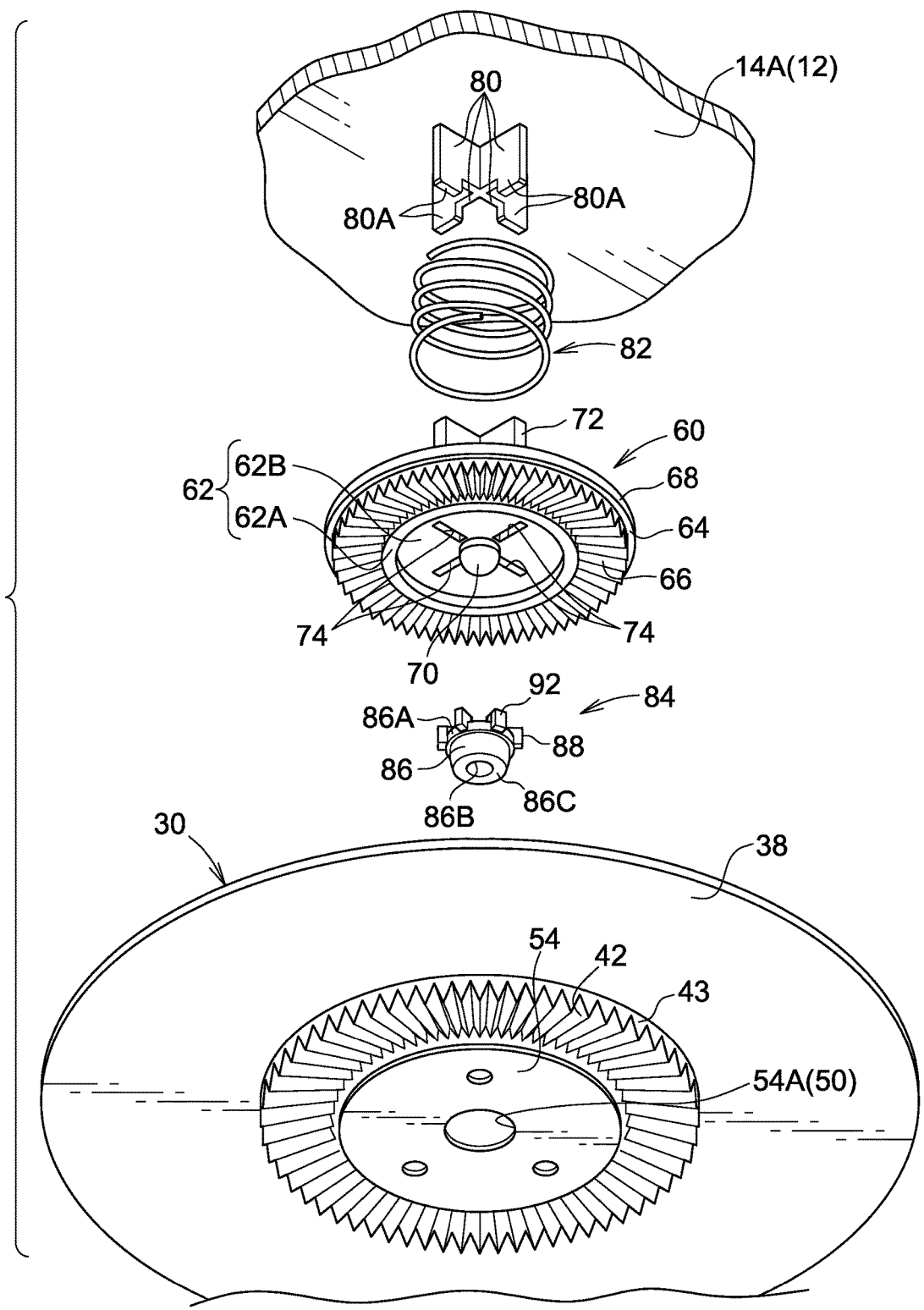
FIG. 5 is an exploded perspective view showing the locking member that structures the recording tape cartridge in accordance with the present exemplary embodiment, viewed from below.

Thus, a structure is formed in which the magnetic tape T is wound onto the outer periphery face of the tube portion 34 of the reel hub 32 of the reel 30 between opposing faces of the lower flange 38 and the upper flange 40. Even though the upper flange 40 is provided, the tube portion 34 opens upward. Meanwhile, as shown in FIG. 1A, FIG. 1B and FIG. 5, the reel gear 42 is formed at an outer periphery vicinity of a lower face of the bottom portion 36 of the reel hub 32. The annular reel gear 42 is coaxial with the reel 30 as a whole.

The reel gear 42 is formed to be meshable with a driving gear 108 that is provided at the distal end of a rotary shaft 106 of the drive device. The rotary shaft 106 is described below. Portions of teeth of the reel gear 42 at the diametric direction outer sides thereof are connected with one another, from tooth height direction middle portions to tooth bases, by a taper portion 43 that is continuous with the lower flange 38.

As shown in FIG. 4, an annular engaging gear 44 is formed at an outer periphery vicinity of the upper face of the bottom portion 36 of the reel hub 32. The engaging gear 44 serves as an engaging portion that is coaxial with the reel 30 as a whole. The engaging gear 44 is formed on an annular seat portion 46 that projects a little from the upper face of the bottom portion 36. The engaging gear 44 is formed to be meshable with a braking gear 66 of a locking member 60, which is described below.

A plural number of upright ribs 48 are provided at the diametric direction outer side of the engaging gear 44, including the seat portion 46. The upright ribs 48 are spaced equidistantly in the circumferential direction. Each of the upright ribs 48 is continuous with the inner periphery face of the tube portion 34 and the upper face of the bottom portion 36, and runs along the axial direction of the reel 30. Because the upright ribs 48 are present, the engaging gear 44 is disposed at the diametric direction inner side relative to the reel gear 42. The functioning of the upright ribs 48 is described together with the locking member 60 below.

As shown in FIG. 2 to FIG. 5, a penetrating hole 50 is formed penetrating through the bottom portion 36 of the reel hub 32 at an axial center portion of the bottom portion 36. A clutch boss portion 52 is provided standing from the upper face of the bottom portion 36. The clutch boss portion 52 is provided in a short tubular shape along an edge portion of the penetrating hole 50. The clutch boss portion 52 is described together with a clutch member 84 below.

A reel plate 54 is coaxially and integrally provided by insert-molding in the lower face of the bottom portion 36 of the reel hub 32, at the inner side of the reel gear 42. The reel plate 54 is an annular plate formed of a magnetic material. A through-hole 54A is formed at an axial center portion of the reel plate 54. An inner diameter of the through-hole 54A is slightly smaller than an inner diameter of the penetrating hole 50.

As shown in FIG. 2 and FIG. 3, in the state in which the reel 30 is accommodated in the case 12, the reel 30 rests on the annular rib 22 at times of non-use. Specifically, outer side portions of the taper portion 43 of the bottom portion 36 of the reel 30 abut against an upper end face of the annular rib 22. The upper end face of the annular rib 22 is formed as a taper surface 22A that corresponds with the taper portion 43. Thus, movement of the reel 30 in the diametric direction is restricted.

In this state, the reel 30 is disposed completely inside the case 12, with the reel gear 42, the reel plate 54 and the like being exposed through the gear aperture 20 (see FIG. 1B).

That is, the reel gear 42 faces outside the case 12 through the gear aperture 20 without protruding lower than the outer face of the floor plate 16A.

Therefore, operation of the reel 30, which is to say chucking and rotary driving, from outside the case 12 is possible.

In the same state, an annular restricting rib 56, which is provided standing from the ceiling plate 14A, is inserted into an upper portion of the tube portion 34 of the reel 30. An outer periphery face of the restricting rib 56 is made to be close to the inner periphery face of the short tube portion 40A of the upper flange 40. Thus, the restricting rib 56 prevents loose movements of the reel 30 inside the case 12.

The recording tape cartridge 10 is also provided with the locking member 60, which locks rotation of the reel 30 at times of non-use. As shown in FIG. 4, the locking member 60 includes a main body portion 62. The main body portion 62 is formed substantially in the shape of a circular tube with a bottom, which opens downward. The main body portion 62 is formed of a tube portion 62A, which is formed in a short tubular shape, and a disc portion 62B, which closes off the upper end of the tube portion 62A. The outer diameter of the tube portion 62A is set to be smaller than an inner diameter of the engaging gear 44, and the inner diameter of the tube portion 62A is set to be larger than an outer diameter of the clutch boss portion 52.

A linking portion 64 that is formed in an annular shape is provided protruding to the diametric direction outer side from an axial direction middle portion of an outer periphery portion of the main body portion 62 (of the tube portion 62A), over the entire circumference thereof. As shown in FIG. 5, the braking gear 66 is provided at a lower face of the link portion 64, over the entire circumference. That is, the braking gear 66 is formed in an annular shape. The braking gear 66 is structured to be meshable with the engaging gear 44 of the reel 30.

Inner end portions of teeth that structure the braking gear 66 are connected with one another by the tube portion 62A. Outer end portions of these teeth are disposed slightly to the diametric direction inner side relative to an outer edge of the linking portion 64. As is shown in FIG. 4, an annular reinforcing rib 68 is provided standing from the upper face of the linking portion 64, along an outer edge portion thereof. The reinforcing rib 68 assures stiffness of the linking portion 64 (the braking gear 66).

As shown in FIG. 5, a sliding protrusion portion 70 is provided protruding from an axial center portion of the lower face of the disc portion 62B of the main body portion 62. A distal end portion of the sliding protrusion portion 70 is formed in a substantially spherical surface shape, so as to make substantial point contact with a metallic plate 96 (a touching surface 96A) of the clutch member 84, which is described below. The distal end of the sliding protrusion portion 70 is disposed slightly upward relative to the lower end face of the tube portion 62A.

As shown in FIG. 4 and FIG. 5, a cross projection 72 is provided standing from the upper face of the disc portion 62B. An insertion slot 72A with a substantial cross shape in plan view is formed inside the cross projection 72. Penetrating holes 74 that penetrate through the disc portion 62B in the plate thickness direction thereof are provided inside the insertion slot 72A. The penetrating holes 74 do not include an axial center portion (an intersection portion) of the insertion slot 72A but are formed as four rectangular holes along the insertion slot 72A. That is, the penetrating holes 74 are each formed adjacent to the diametric direction outer side of the sliding protrusion portion 70.

An annular rib 76 is provided at an upper end outer periphery portion of the main body portion 62. The upper face of the disc portion 62B between the rib 76 and the cross projection 72 serves as a spring holding surface 78 against which one end portion of a compression coil spring 82, which is described below, abuts. Thus, the locking member 60 is insertedly provided inside the tube portion 34 of the reel hub 32, to be substantially coaxial therewith and movable in an up-and-down direction (the axial direction of the reel 30).

That is, the locking member 60 is capable of assuming a locking position and an allowing position by moving in the up-and-down direction. In the locking position, the braking gear 66 is meshed with the engaging gear 44 of the reel hub 32. In the allowing position, this meshing is released. A length of the tube portion 62A is determined such that a lower end face thereof does not abut against the bottom portion 36 when the locking member 60 is at the locking position (see FIG. 2).

As shown in FIG. 2 to FIG. 5, a cross rib 80 is provided protruding downward from the ceiling plate 14A of the case 12. The cross rib 80 enters into the insertion slot 72A of the cross projection 72 of the locking member 60. The cross rib 80 is formed in a detent shape in which two thin plates intersect with one another so as to be orthogonal. By engaging with the cross projection 72 (i.e., slot walls of the insertion slot 72A), the cross rib 80 blocks rotation of the locking member 60 relative to the case 12.

Therefore, the locking member 60 may block rotation of the reel 30 by the braking gear 66 of the locking member 60 meshing with the engaging gear 44 of the reel hub 32. The state in which the cross rib 80 enters into the insertion slot 72A is maintained over the entire movement stroke of the locking member 60 in the up-and-down direction. Thus, the cross rib 80 is a structure that implements a function of guiding the direction of movement of the locking member 60 in the up-and-down direction.

Four projection pieces 80A are formed at a lower end portion of the cross rib 80. The projection pieces 80A are provided to protrude in correspondence with the penetrating holes 74 of the locking member 60. Respective widths of the projection pieces 80A (lengths thereof in the diametric direction of the locking member 60) are determined to correspond with length direction dimensions of the penetrating holes 74. Thus, the projection pieces 80A are structures that may enter into respectively different holes of the penetrating holes 74.

That is, the projection pieces 80A are disposed inside the insertion slot 72A when the locking member 60 is disposed at the locking position (see FIG. 2), and the projection pieces 80A penetrate through the respective penetrating holes 74 and protrude beyond the lower face of the disc portion 62B when the locking member 60 is disposed at the allowing position (see FIG. 3). Because the projection pieces 80A are provided, an engagement amount of the cross rib 80 with the locking member 60 (an insertion depth) is increased, and tilting of the locking member 60 relative to the case 12 may be suppressed or prevented.

The locking member 60 is structured such that movement of the reel 30 in the diametric direction is restricted by the upright ribs 48 when the locking member 60 is disposed at the locking position, but there is no chance of interference between the locking member 60 and the upright ribs 48 rotating together with the reel 30 when the locking member 60 is disposed at the allowing position. Accordingly, an upper portion of the upright ribs 48 is cut away such that the upright ribs 48 are disposed close to the reinforcing rib 68 when the locking member 60 is disposed at the locking position, but separations between the upright ribs 48 and the reinforcing rib 68 are at least a predetermined value when the locking member 60 is disposed at the allowing position.

Thus, the reel 30 is formed such that movement thereof is directly restricted by the case 12 (the annular rib 22 and the restricting rib 56), and such that movement in the diametric direction relative to the case 12 is restricted via the locking member 60 in a vicinity of the position of the center of gravity. Therefore, the recording tape cartridge 10 may be reliably loaded even into a drive device that is disposed in an upright arrangement (i.e., with the axial direction of the reel 30 in the horizontal direction).

The compression coil spring 82 is disposed between the spring holding surface 78 of the locking member 60 and the ceiling plate 14A, to serve as an urging means. The one end portion of the compression coil spring 82 abuts against the spring holding surface 78 and another end portion of the compression coil spring 82 abuts against the ceiling plate 14A. An annular wall portion 58 is provided protruding from the ceiling plate 14A at the outer side relative to the cross rib 80. The other end portion of the compression coil spring 82 is disposed at the inner side of the annular wall portion 58 such that the other end portion of the compression coil spring 82 is not displaced in the diametric direction.

The locking member 60 is urged downward by an urging force of the compression coil spring 82. Thus, at usual times the braking gear 66 is meshed with the engaging gear 44 and unwanted rotation of the reel 30 is blocked. In addition, the reel 30 is urged downward by the urging force via the locking member 60, and the reel 30 abuts against the annular rib 22 so as not to move loosely inside the case 12.

As shown in FIG. 2 to FIG. 5, the recording tape cartridge 10 is further provided with the clutch member 84 that serves as a release member that is operated from outside the recording tape cartridge 10 when the state of locking of the reel 30 by the locking member 60 is to be released. The clutch member 84 is formed of a resin material such as polyamide (PA), polyacetal (POM) or the like. The clutch member 84 is disposed between the bottom portion 36 of the reel 30 and the locking member 60 so as to close off the penetrating hole 50.

Describing this more specifically, the clutch member 84 includes a clutch main body 86 formed in a substantially circular shaft shape. An outer diameter of the clutch main body 86, excluding a projecting portion 86A described below, is set to be slightly smaller than the inner diameter of the penetrating hole 50. The projecting portion 86A is formed at an upper end portion of the clutch main body 86. The projecting portion 86A projects a little to the diametric direction outer side over the whole circumference of the clutch main body 86. The metallic plate 96 that usually abuts against the sliding protrusion portion 70 of the locking member 60 is mounted at an upper end face of the clutch main body 86, at the diametric direction inner side relative to the projecting portion 86A. Details of the structure of the metallic plate 96 are described below.

A hollowed cavity 86B that opens downward is formed at an axial center portion of the clutch main body 86. A flat lower end face around the hollowed cavity 86B serves as a pushing surface 86C. As is described in detail below, the clutch member 84 is a structure that, when the pushing surface 86C is pushed upward, moves upward in opposition to the urging force of the compression coil spring 82 and moves the locking member 60 to the allowing position.

The clutch member 84 is also provided with rotation restricting ribs 88 that project to the diametric direction outer side relative to an outer periphery face of the projecting portion 86A (of the clutch main body 86). Three of the rotation restricting ribs 88 are provided, spaced equidistantly in the circumferential direction of the clutch main body 86. Thus, the rotation restricting ribs 88 are arranged in a radiating pattern in plan view. The rotation restricting ribs 88 are formed continuously over both an upper end face of the clutch main body 86 and the outer periphery face of the projecting portion 86A. Thus, the rotation restricting ribs 88 protrude upward and to the diametric direction outer side.

The rotation restricting ribs 88 respectively enter into rotation restricting slots (guide slots) 90 that are formed at an inner edge portion of the clutch boss portion 52. The rotation restricting slots 90 open upward at the upper end of the clutch boss portion 52. Thus, the rotation restricting ribs 88 of the clutch member 84 are guided by the rotation restricting slots 90 and movement of the clutch member 84 in the up-and-down direction is enabled.

When the clutch member 84 moves upward and the locking member 60 is disposed at the allowing position, the rotation restricting ribs 88 maintain the state in which the rotation restricting ribs 88 enter into the rotation restricting slots 90. Therefore, the clutch member 84 is a structure that always rotates integrally with the reel 30.

The clutch member 84 is further provided with seating ribs 92 that function as a stopper portion for blocking a fall from the reel hub 32 and allowing the metallic plate 96 to abut against the locking member 60 disposed at the locking position. Three of the seating ribs 92 are provided, at circumferential direction intermediate portions between the respective rotation restricting ribs 88 of the clutch main body 86. Thus, the seating ribs 92 are arranged in a radiating pattern in plan view. The seating ribs 92 are formed continuously over both the upper end face of the clutch main body 86 and the outer periphery face of the projecting portion 86A. Thus, the seating ribs 92 protrude upward and to the diametric direction outer side.

The seating ribs 92 respectively enter into stopper slots 94 that are formed at the inner edge portion of the clutch boss portion 52. The stopper slots 94 open upward at the upper end of the clutch boss portion 52. Lower portion upper faces that close off lower end portions of the stopper slots 94 serve as stopper faces 94A. When the locking member 60 is disposed at the locking position, the clutch member 84 is positioned by the lower end faces of the seating ribs 92 abutting against the stopper faces 94A, such that the metallic plate 96 is caused to abut against the sliding protrusion portion 70 at usual times.

Thus, because the rotation restricting ribs 88 and the seating ribs 92 are provided separately from one another, the clutch member 84 is a structure in which a guiding function and a rotation restriction function are separated from a function of restricting movement in the axial direction of the reel 30.

The clutch member 84 includes the metallic plate 96 at the upper end face of the clutch main body 86, at the diametric direction inner side relative to the rotation restricting ribs 88 and the seating ribs 92 (and the projecting portion 86A). The metallic plate 96 is punched from a flat sheet of stainless steel by pressing using a punch and die. Thus, the metallic plate 96 is formed in a flat disc shape that includes hole portions 98 and countersink portions 98A, which are described below.

Figure 6:
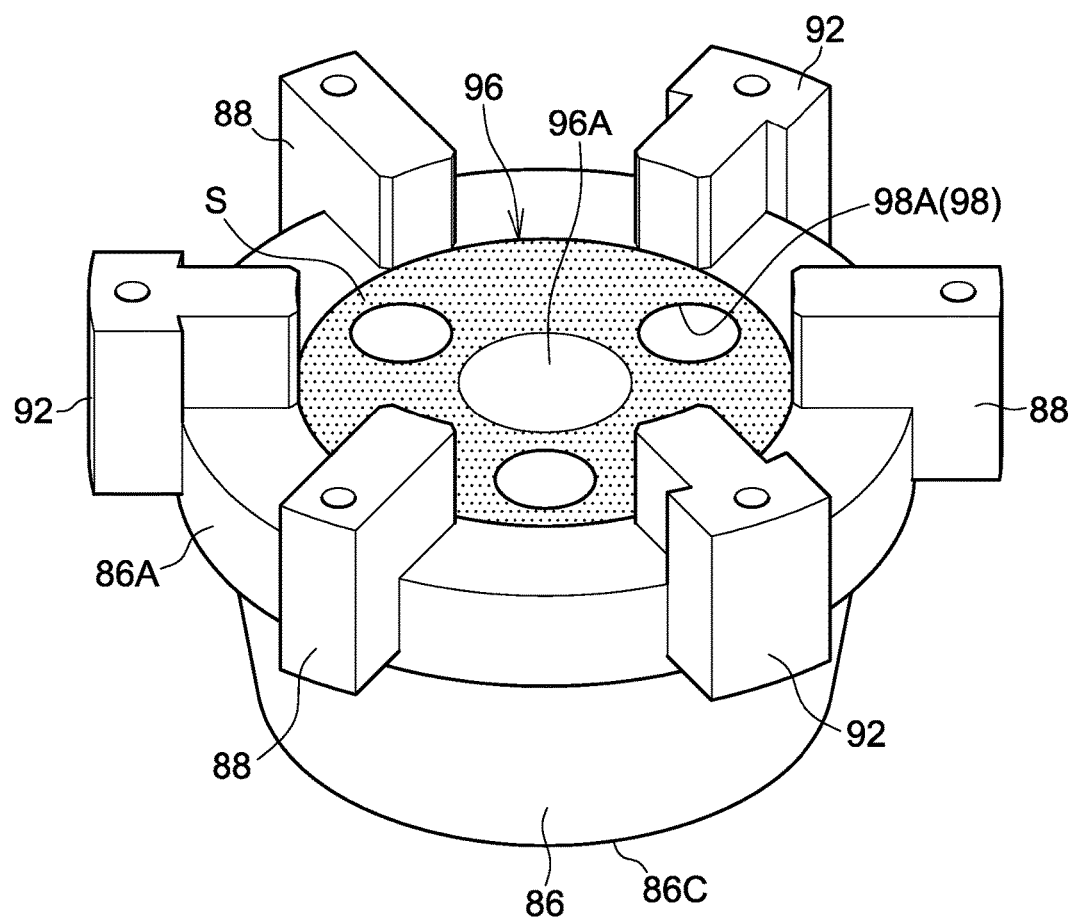
FIG. 6 is a perspective view showing a clutch member that structures the recording tape cartridge in accordance with the present exemplary embodiment.
Figure 7:
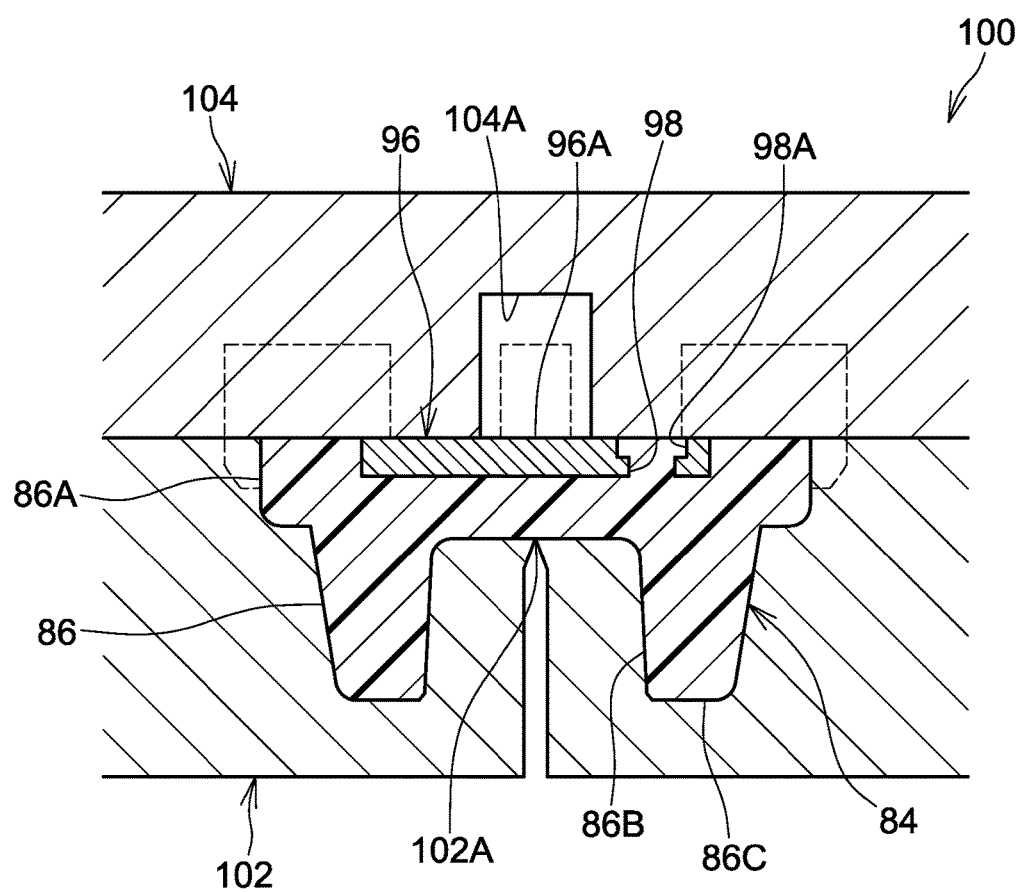
FIG. 7 is a sectional diagram showing a die that molds the clutch member that structures the recording tape cartridge in accordance with the present exemplary embodiment.

Three of the hole portions 98 are formed in the metallic plate 96, spaced equidistantly in the circumferential direction of the metallic plate 96. The hole portions 98 penetrate through the metallic plate 96 in the plate thickness direction thereof. The countersink portions 98A are formed at inner edge portions at the upper sides of the hole portions 98. The countersink portions 98A have larger diameters than the hole portions 98. As shown in FIG. 6 and FIG. 7, the metallic plate 96 is integrally mounted in the upper end face of the clutch main body 86 by insert-molding.

To describe this in detail, a die 100 that molds the clutch member 84 includes a core 102 and a cavity 104. A circular shaft-shaped cavity portion 104A (or possibly a penetrating hole with a circular shape in plan view) is formed in the cavity 104. When the metallic plate 96 has been placed inside the die 100, a central portion (an axial center portion) of an upper face of the metallic plate 96 is prevented from coming into contact with the cavity 104 (i.e., the die 100) by the cavity portion 104A.

That is, a circular region of the upper face of the metallic plate 96 placed in the die 100, which region faces the cavity portion 104A, becomes the touching surface 96A against which the sliding protrusion portion 70 of the locking member 60 abuts (touches). Accordingly, an inner diameter of the cavity portion 104A is set to a larger diameter than the distal end portion of the sliding protrusion portion 70, but is set to a size that does not extend to diametric direction inner side end portions of the hole portions 98.

It is desirable if the central portion (axial center portion) of the upper face of the metallic plate 96, which is to say the touching surface 96A of the metallic plate 96 that faces the cavity portion 104A, is finished to a mirror surface by machine processing (grinding, polishing), plating, coating or the like. To be specific, a surface roughness of the touching surface 96A of the metallic plate 96 is, for example, desirably within a range of arithmetic mean roughness (Ra) of 0.01 μm to 0.3 μm, and more desirably in a range from 0.01 μm to 0.1 μm.

A plate thickness of the metallic plate 96 is in a range from 0.05 mm to 0.7 mm, is preferably in a range from 0.1 mm to 0.5 mm, and is more preferably in a range from 0.2 mm to 0.3 mm. The numerical range of the plate thickness of the metallic plate 96 is specified to strike a balance between reducing plate thickness, which is desired to assure a release stroke of the locking member 60 by the clutch member 84, and preventing bending, which is desired in regard to assurance of dimensional precision and ease of assembly.

In accordance with the metallic plate 96 and the die 100 with the structures described above, the clutch member 84 is molded as follows. First, the metallic plate 96 is placed inside the die 100. At this time, the metallic plate 96 is disposed in the die 100 in a state in which a portion of the upper face of the metallic plate 96 that is to be exposed from the clutch main body 86, which portion excludes the touching surface 96A, is in contact with the cavity 104 and an upper face side portion of an outer periphery face of the metallic plate 96 is positioned and retained by the cavity 104 (an arranging step).

Then, a molten resin material such as PA, POM or the like is charged into the die 100 through a gate 102A formed in the core 102. Thus, the clutch main body 86 in whose upper end face the metallic plate 96 is integrally mounted, by the resin material entering the hole portions 98 (and the countersink portions 98A) and solidifying, is molded (a molding step).

Dimensional precision of the molded product is higher at portions closer to the gate 102A. Therefore, it is desirable for the gate 102A to be provided at a location close to the metallic plate 96. In the case of the clutch member 84, the gate 102A is provided at, as an example, a bottom face of the interior of the hollowed cavity 86B. Thus, in the case of the clutch member 84, a gate mark G is formed at the bottom face of the interior of the hollowed cavity 86B (see FIG. 2 and FIG. 8).

In a state in which the rotation restricting ribs 88 and seating ribs 92 of the clutch member 84 that has been molded in this manner are inserted into the respectively different rotation restricting slots 90 and stopper slots 94, the clutch main body 86 of the clutch member 84 is inserted through the penetrating hole 50 and the through-hole 54A. Hence, at usual times, the seating ribs 92 are retained in a state of abutting against the stopper faces 94A by the urging force of the compression coil spring 82 that acts thereon via the locking member 60. In this state, the lower end faces of the rotation restricting ribs 88 are slightly separated from the bottom faces of the rotation restricting slots 90.

Further, in this state, the upper portion of the clutch member 84 and the clutch boss portion 52 enter into the tube portion 62A of the locking member 60. With the clutch boss portion 52, the tube portion 62A forms a labyrinthine structure such that the ingression of dust through the penetrating hole 50 into the reel hub 32 (the case 12) is suppressed. In addition, while there is no functional need for the seating ribs 92 to enter into the stopper slots 94, the ingression of dust into the reel hub 32 is suppressed by the seating ribs 92 entering the stopper slots 94.

As illustrated in FIG. 2 and FIG. 3, in association with an operation of the reel gear 42 meshing with the driving gear 108 provided at the rotary shaft 106 that serves as an operation member at a drive device, the pushing surface 86C of the clutch member 84 is pushed by a release surface 114A of the rotary shaft 106 and moves upward. Thus, in the state in which the reel gear 42 is meshed with the driving gear 108, the clutch member 84 is kept in the state in which the pushing surface 86C abuts against the release surface 114A, and the locking member 60 is retained at the allowing position.

During rotation of the reel 30, there is no relative rotation between the clutch member 84 rotating integrally with the reel 30 and the rotary shaft 106 driving the reel 30. However, the clutch member 84 and the locking member 60 that is non-rotatable relative to the case 12 relatively rotate. Therefore, the touching surface 96A of the metallic plate 96 and the distal end of the sliding protrusion portion 70 are in sliding contact with one another.

A holding bolt 112 is provided at the rotary shaft 106. An upper end face of a head portion 114 of the holding bolt 112 serves as the release surface 114A that abuts against the pushing surface 86C of the clutch member 84. A height of the release surface 114A may be adjusted by changes to a threading amount of the holding bolt 112 in a threaded hole.

A magnet 110 is provided at the rotary shaft 106, for attracting and retaining the reel plate 54. The release surface 114A is finished to a flatness equal to or flatter than an upper face of the magnet 110. Thus, a structure is formed in which a position of the release surface 114A relative to the pushing surface 86C is positioned in the axial direction of the reel 30 and the attitude of the clutch member 84 whose pushing surface 86C is being pushed by the release surface 114A is stable.

Now, operations of the recording tape cartridge 10 structured as described above are described.

At times of non-use of the recording tape cartridge 10, the locking member 60 is disposed at the locking position by the urging force of the compression coil spring 82, and the braking gear 66 is meshed with the engaging gear 44. Therefore, rotation of the reel 30 relative to the case 12 is blocked. At these times, the reel gear 42 of the reel 30 is exposed through the gear aperture 20, and the clutch main body 86 of the clutch member 84 is inserted through the penetrating hole 50 and the through-hole 54A and faces the gear aperture 20.

When the magnetic tape T is to be used, the recording tape cartridge 10 is loaded in the direction of arrow A into a bucket (not shown in the drawings) of a drive device. When the recording tape cartridge 10 has been loaded in the bucket to a predetermined depth, the bucket descends. The rotary shaft 106 of the drive device relatively moves toward the gear aperture 20 of the case 12 and retains the reel 30.

To be specific, the magnet 110 of the rotary shaft 106 attracts and retains the reel plate 54 without contact therewith, and the driving gear 108 meshes with the reel gear 42 which is exposed through the gear aperture 20. In association with this meshing of the reel gear 42 with the driving gear 108, the release surface 114A is abutted against the pushing surface 86C of the clutch member 84 and the rotary shaft 106 pushes the clutch member 84 upward.

Accordingly, the clutch member 84 is moved to the upper side in the axial direction of the reel 30 in opposition to the urging force of the compression coil spring 82 by this pushing force, while the rotation restricting ribs 88 of the clutch member 84 are guided by the rotation restricting slots 90. As a result, the locking member 60 that is abutting against the metallic plate 96 of the clutch member 84 at the sliding protrusion portion 70 moves upward, and the meshing between the braking gear 66 of the locking member 60 and the engaging gear 44 is released.

When the rotary shaft 106 relatively moves further upward, the reel 30 is lifted upward together with the clutch member 84 and the locking member 60 against the urging force of the compression coil spring 82. When the locking member 60 reaches the allowing position, the lower flange 38 is separated from the annular rib 22. In this manner, the reel 30 rises inside the case 12 and becomes rotatable in a state of non-contact with the inner faces of the case 12.

The respective positioning pins of the drive device enter into the positioning holes 24 and 26 of the case 12 when the recording tape cartridge 10 descends in the drive device, and the positioning surfaces of the drive device abut against the positioning surfaces 24A and 26A of the case 12. Thus, the recording tape cartridge 10 is positioned in the horizontal directions and the vertical direction relative to the drive device.

Correspondingly, a pull-out pin (not shown in the drawings) of the pull-out member of the drive device is engaged with the engaging slot portion 28A of the leader block 28, and the leader block 28 is disengaged from the case 12 and guided to the take-up reel of the drive device. The leader block 28 is fitted into the take-up reel and the circular arc face 28B structures a portion of the take-up surface onto which the magnetic tape T is to be taken up.

In this state, when the leader block 28 rotates integrally with the take-up reel, the magnetic tape T is taken up onto a reel hub of the take-up reel while being pulled out from the case 12 through the aperture 18. At this time, the reel 30 of the recording tape cartridge 10 is rotated in synchrony with the take-up reel by rotary force of the rotary shaft 106, which is transmitted by the driving gear 108 that is meshed with the reel gear 42.

Data is recorded onto the magnetic tape T and/or data recorded on the magnetic tape T is replayed by a recording/replay head that is disposed along a predetermined tape path in the drive device. At this time, the sliding protrusion portion 70 of the locking member 60, of which rotation relative to the case 12 is blocked, slidingly contacts the metallic plate 96 of the clutch member 84 that is rotating relative to the case 12 together with the reel 30.

That is, the distal end of the sliding protrusion portion 70 that is constituted of the resin material abuts against the touching surface 96A of the metallic plate 96. Therefore, even if a rotation speed of the reel 30 (a conveyance speed of the magnetic tape T) is increased in order to shorten access times to desired recording positions and data, wear of the sliding protrusion portion 70 that is sliding in accordance with the rotation of the reel 30 is suppressed compared to a clutch member (not shown in the drawings) that does not include the metallic plate 96.

During the molding of the clutch member 84, because the die 100 (the cavity 104) makes contact with the upper surface of the metallic plate 96 excluding the touching surface 96A, annular contact damage S is formed. However, because the die 100 (the cavity 104) does not make contact with the touching surface 96A of the metallic plate 96, contact damage S is not formed by contact with the die 100 at the touching surface 96A (see FIG. 6).

Therefore, during the rotation of the reel 30, disorder in the behavior of the clutch member 84 relative to the sliding protrusion portion 70 of the locking member 60 is suppressed or prevented, and occurrences of the sliding protrusion portion 70 of the locking member 60 receiving, for example, diametric direction force components from the touching surface 96A of the metallic plate 96 are suppressed or prevented. Consequently, the production of noise during the rotation of the reel 30 may be suppressed or prevented.

In particular, if the surface roughness of the touching surface 96A of the metallic plate 96 is an arithmetic mean roughness of not more than 0.3 µm, and desirably not more than 0.1 µm, disorder in the behavior of the clutch member 84 may be further suppressed or prevented. Thus, the production of noise during the rotation of the reel 30 may be even more effectively suppressed or prevented.

Moreover, with this structure in which the contact damage S is not formed at the touching surface 96A of the metallic plate 96 (the structure in which the surface roughness of the touching surface 96A is an arithmetic mean roughness of 0.3 µm or less), there is an advantage in that the material of the metallic plate 96 need not be limited to expensive stainless steel. That is, the metallic plate 96 may be fabricated of a metallic material that is cheaper than stainless steel while keeping production quality reliable, and costs relating to the metallic plate 96 may be reduced.

Then, when the magnetic tape T has been wound back to the reel 30 and the leader block 28 is retained in the vicinity of the aperture 18 of the case 12, the bucket in which the recording tape cartridge 10 is loaded ascends. Correspondingly, the meshing between the reel gear 42 and the driving gear 108 is released, the abutting of the release surface 114A against the pushing surface 86C of the clutch member 84 is released, and the clutch member 84 is moved downward together with the locking member 60 by the urging force of the compression coil spring 82.

Consequently, the seating ribs 92 of the clutch member 84 abut against the stopper faces 94A and the braking gear 66 of the locking member 60 meshes with the engaging gear 44. That is, the locking member 60 returns to the locking position that blocks rotation of the reel 30 relative to the case 12. Meanwhile, in association with the operation in which the locking member 60 and the clutch member 84 are moved by the urging force of the compression coil spring 82, the reel 30 also moves downward and returns to the initial state in which the lower flange 38 abuts against the annular rib 22 while the reel gear 42 is exposed through the gear aperture 20. In this state, the recording tape cartridge 10 is ejected from the bucket.

Figure 8:
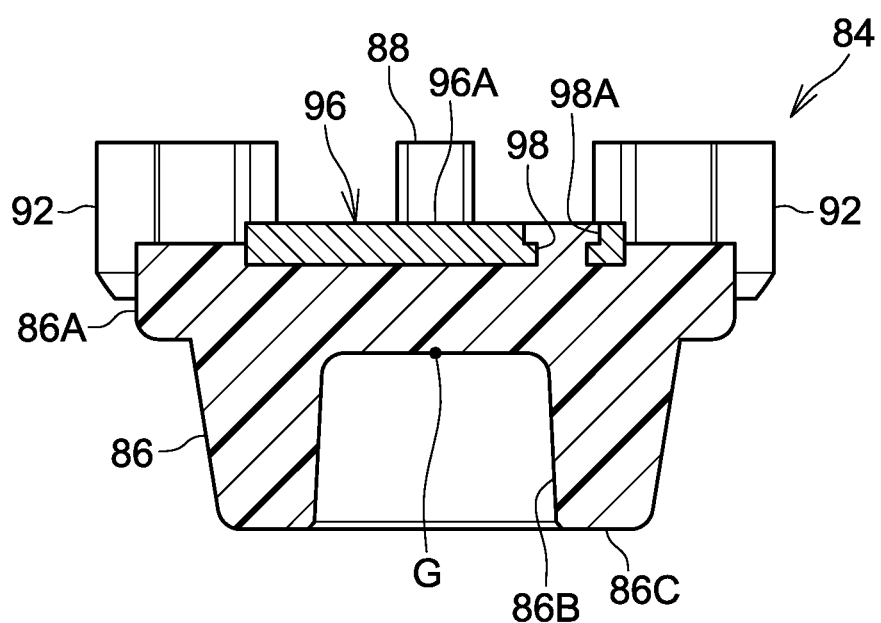
FIG. 8 is a sectional diagram showing a variant example of the clutch member that structures the recording tape cartridge in accordance with the present exemplary embodiment.

While the operation of the recording tape cartridge 10 relating to the present exemplary embodiment is as described above, the clutch member 84 may have a structure in which, as illustrated in FIG. 8, half or more of the metallic plate 96 protrudes in the thickness direction thereof from the upper end face of the clutch main body 86. That is, in the arranging step, it may be that a portion of the outer periphery face of the metallic plate 96 that is half or more of the thickness is retained by the cavity 104 (of the die 100).

In this case, because a region of the interior of the die 100 that retains the metallic plate 96 may be increased, the metallic plate 96 may be positioned and retained more accurately. As a result, production quality of the clutch member 84 in which the metallic plate 96 is integrally mounted by the insert-molding may be made more reliable.

Figure 9:
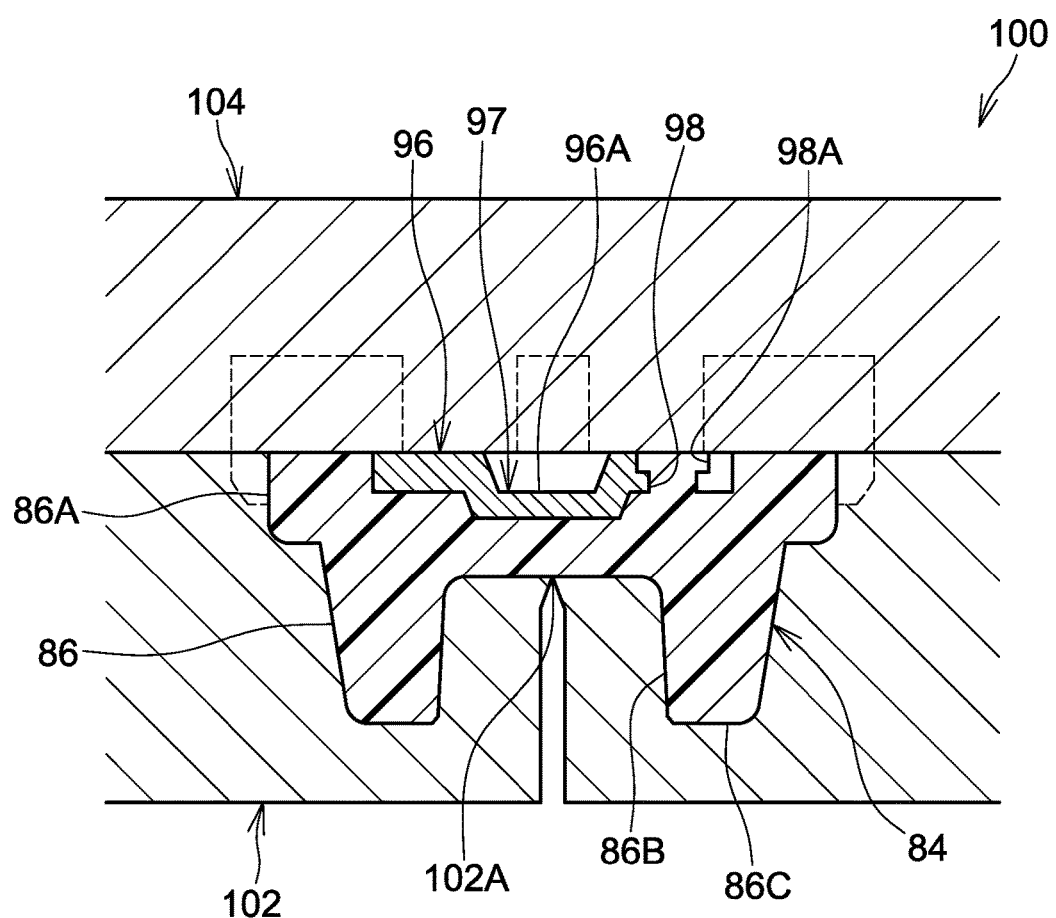
FIG. 9 is a sectional diagram showing a die that molds the variant example of the clutch member that structures the recording tape cartridge in accordance with the present exemplary embodiment.

Further, as illustrated in FIG. 9, the clutch member 84 may have a structure in which the metallic plate 96 includes a sunken portion 97, at which a central portion (an axial center portion) of the metallic plate 96 is sunk downward, and this metallic plate 96 is integrally mounted in the upper end face of the clutch main body 86 by the insert-molding. In the case of this metallic plate 96, a bottom face inside the sunken portion 97 serves as the circular touching surface 96A with a larger diameter than the distal end portion of the sliding protrusion portion 70.

In the case of this metallic plate 96, even if the cavity portion 104A (or a penetrating hole) is not formed in the cavity 104, only the upper face excluding the sunken portion 97 makes contact with the cavity 104 (the die 100) when the metallic plate 96 is placed in the die 100; the touching surface 96A inside the sunken portion 97 does not make contact with the cavity 104 (the die 100). Thus, with this metallic plate 96, the formation of contact damage S at the touching surface 96A may be avoided without a design change of the shape of the die 100 (the cavity 104).

Hereabove, the molding method of the clutch member 84 and the recording tape cartridge 10 according to the present exemplary embodiment have been described in accordance with the drawings. However, the molding method of the clutch member 84 and the recording tape cartridge 10 according to the present exemplary embodiment are not limited by the drawings. Suitable design modifications may be applied within a scope not deviating from the gist of the present invention.

For example, the metallic plate 96 is not limited to a circular shape (a disc shape) but may be formed in a square shape, an equilateral triangle shape or the like. Further, a method of fabricating (machining) the metallic plate 96 is not particularly limited. That is, the metallic plate 96 is not limited to a structure that is formed by punching.

Although not shown in the drawings, the metallic plate 96 may be a structure that is mounted by insert-molding in an alternative release member such as, for example, a release pad with a substantially triangular shape in plan view in which three release projections protrude from above the reel gear 42, or the like. In the case of a release pad, a plane joining the three release projections serves as the pushing surface.

The recording tape cartridge 10 according to the present exemplary embodiment is a structure that includes the leader block 28 to serve as the leader member. However, this is not limiting. As examples, although not shown in the drawings, a structure that includes a leader pin with a substantially circular rod shape or a structure that includes a covering member that opens and closes the aperture 18 (a sliding door that moves along a predetermined straight line or circular arc, or the like) may be formed.

The present exemplary embodiment has a structure in which the magnetic tape T is used as the recording tape, but this is not limiting. It is sufficient to understand the recording tape as being an information recording/replaying medium in a long, narrow tape shape at which data may be recorded and recorded data may be replayed. The recording tape cartridge 10 according to the present exemplary embodiment is obviously applicable to recording tapes of any recording/replay format.

What is claimed is:

1. A recording tape cartridge comprising:
    a reel at which a recording tape is wound onto a reel hub whose shape is a circular tube with a bottom portion, the reel being rotatably accommodated in a case;
    a locking member that is provided in the reel hub to be movable in a reel axial direction, the locking member being capable of attaining a locking position at which the locking member locks rotation of the reel and an allowing position at which the locking member allows rotation of the reel relative to the case;
    a release member that is provided in the reel hub to be rotatable integrally with the reel, the release member moving the locking member from the locking position to the allowing position when the release member is pushed from an outer side of the case;
    a sliding protrusion portion that protrudes from the locking member toward a side at which the release member is disposed; and
    a metallic plate that is provided by insert-molding in a main body of the release member, contact damage from a die not being formed at a touching surface of the metallic plate, at which touching surface the metallic plate touches a distal end of the sliding protrusion portion, and contact damage from the die being formed at a portion of the metallic plate that is exposed from the main body, which portion excludes the touching surface; wherein
    in a case in which the locking member is in the locking position, the distal end of the sliding protrusion portion contacts the metallic plate.

2. The recording tape cartridge according to claim 1, wherein a hollowed cavity that opens to the outer side of the case is formed at an axial center portion of the release member, and a gate mark of the insert-molding is formed at a bottom face of the hollowed cavity.

* * * * *